June 12, 1923.
H. H. SHAPIRO
DENTAL APPARATUS
Filed March 1, 1922
1,458,782
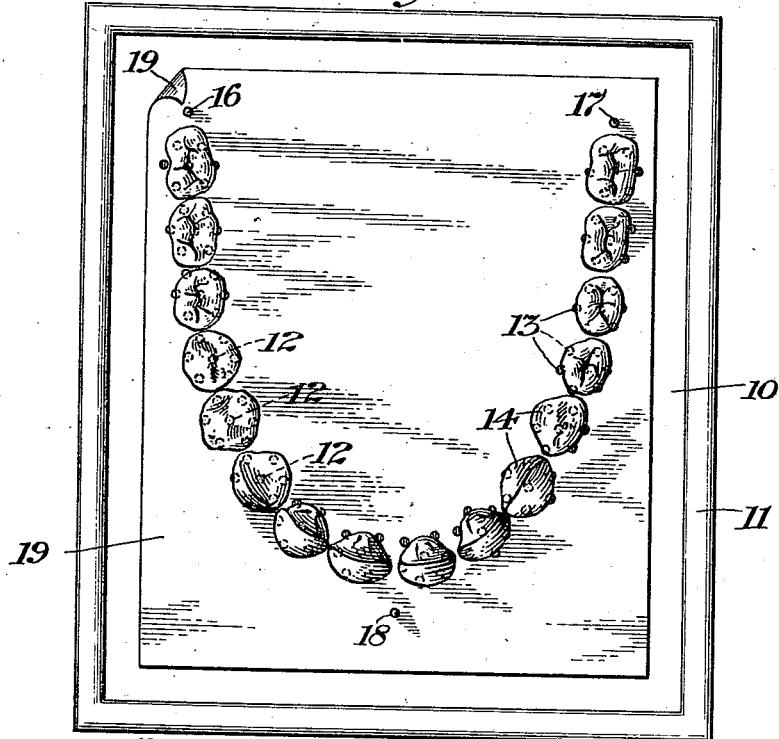
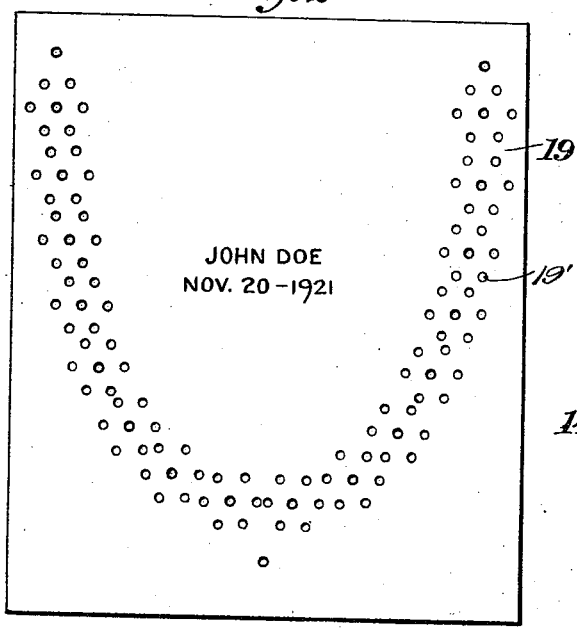
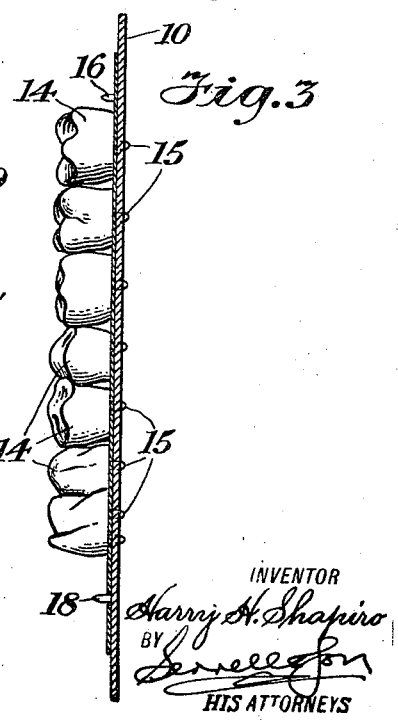

Patented June 12, 1923.

1,458,782

UNITED STATES PATENT OFFICE.

HARRY H. SHAPIRO, OF NEW YORK, N. Y.

DENTAL APPARATUS.

Application filed March 1, 1922. Serial No. 540,327.

*To all whom it may concern:*

Be it known that I, HARRY H. SHAPIRO, a citizen of the United States, residing in the borough of Manhattan, city, county, and State of New York, have invented an Improvement in Dental Apparatus, of which the following is a specification.

This invention relates to a dental apparatus and more particularly to a device for use in prosthetic dentistry. There are several methods of restoring teeth by artificial ones, for example, by the use of crowns, bridges, plates and like devices, and in accordance with present dental practices there are several methods employed in determining the best appliance to employ in prosthetic work in any individual case. For instance it is customary to reach a conclusion in such cases from a knowledge derived from a general examination of the oral cavity, the study of X-ray films of the mouth, as well as from the study of the articulation of the jaws from plaster molds made of the mouth. It is often difficult, however, with the data heretofore used to determine positively in any case upon the best manner of procedure and from the more or less unsatisfactory means heretofore employed it has been necessary to visualize to some extent in reaching a definite conclusion. The object of my present invention is to overcome these difficulties and to provide an apparatus in the use of which a diagram or chart of the mouth of the patient in any case may be made and studied from all view points in determining upon which is the best device to employ in supplying the missing teeth.

In carrying out the invention, I employ a plate in which there is arranged a series of holes on a line made in accordance with a normal occlusal arch curve and spaced in positions representing normal centers of the teeth, together with a set of artificial crowns in each of which there is a pin or dowel adapted to be received in one of the holes in the plate with an intermediate chart placed between the plate and the teeth. In the plate also and surrounding or otherwise arranged in relationship to each of the centrally placed holes in the occlusal arch curve there are series of additional holes into any one of which the teeth may be placed. As will be understood the chart may be placed and secured over the plate and the crowns placed in the holes in the plate in such positions as to represent the positions of the teeth in any individual case so that the practitioner has visualized before him the actual conditions to be met and overcome and is thus enabled to study and determine the best appliance to employ after taking into consideration the conditions of the mouth and the strains and stresses to be carried by the particular device which it may be determined is best to employ.

The apparatus made in accordance with this invention is shown in the accompanying drawing, in which, Fig. 1 is a plan view illustrating the device.

Fig. 2 is a plan of the chart, and

Fig. 3 is a section illustrating the manner in which the parts of the apparatus are assembled for use.

Referring to the drawing, it will be seen that in carrying out the invention the apparatus preferably includes a plate 10 which may be made of metal, preferably aluminum or any other suitable material, although not necessary this plate may be placed in a suitable frame 11. In the plate 10 there is a series of holes 12. These are arranged on the normal occlusal arch curve and in positions spaced to represent the normal centers of the teeth. Surrounding or otherwise associated with each of the holes 12 there is a series of additional or auxiliary holes 13.

The apparatus also includes a set of artificial crowns indicated at 14. Each of these in its base is fitted with a dowel or pin 15, the outer extremity of which is preferably pointed, each pin being adapted to be received in any of the holes 12 and 13 in the plate 10 to set the crown in a place that will approximately represent the position of the corresponding tooth in the mouth of a patient.

In suitable positions in the plate 10 I also employ pegs indicated at 16, 17 and 18. As illustrated the pegs 16 and 17 are placed at the upper end of the plate and the peg 18 at the lower end thereof. It will be understood, however, that these pegs may assume different positions and that any number of the same may be employed. These pegs are used to fix and maintain in position a chart 19 which may be made of paper or any other similar material. The chart is placed over the pegs 16, 17 and 18 in the use of the apparatus and then the crowns representing the teeth in any given case are placed in position in the plate by puncturing the chart by the pins connected to the crowns and passing the pins into the necessary holes in the plate to place the crowns in these positions.

It will be understood that the dots 19' on the chart correspond with the holes 12 and 13 in the plate, and that in the use of the apparatus the chart is placed and secured on the plate in such a position that the dots 19' on the chart are superimposed on the holes in the plate; then with the crown placed in position as hereinbefore described to approximately represent the positions of the teeth of a patient in any given case the practitioner may sketch various appliances on the chart, any of which appliances may be employed to secure in position the required artificial teeth in the case under consideration, these sketches being placed on the same or a number of charts so as to make a comparative study of the same possible in reaching a conclusion as to the best appliance to be employed.

It will now be apparent that the exact conditions to be considered and dealt with in any particular case may be made and sufficiently studied before determining upon the best device to employ in fixing the necessary artificial teeth in position in the patient's mouth and that no use of the imagination is necessary even in instances where extraction of certain teeth is desirable because the chart may be made to assume the conditions with the crowns representing the teeth which should be extracted removed from the chart. It will also be apparent that as many of these charts as may be necessary may be employed in figuring out the particular appliance to be used in any given case and that a complete record of the work may be kept for the examination by the patient and for future reference. It will furthermore be apparent that the apparatus made in accordance with this invention is also adapted for valuable use in orthodontic work in which a complete record may be kept of the malposed teeth from the beginning of treatment until the same is completed. It will still furthermore be apparent that the apparatus may be constructed to be applied to both the upper and lower jaws of the mouth.

I claim as my invention:

1. A dental apparatus comprising a plate having a series of holes arranged in an occlusal arch curve therein, a chart, and a set of artificial crowns adapted to be arranged in various positions in the plate with the chart intervening between the same and the plate.

2. A dental apparatus comprising a plate having a series of spaced holes arranged in an occlusal arch curve therein and a plurality of holes associated with each of the aforesaid holes, a chart, and a set of artificial crowns adapted to be arranged in various positions in the plate by employing the holes therein with the chart intervening between the crowns and the plate.

3. A dental apparatus comprising a plate having a series of holes arranged in an occlusal arch curve therein and also having a series of holes associated with each of the aforesaid holes, a chart, a set of artificial crowns each having a pointed dowel extending from its base adapted to be received in any of the holes in the plate to enable the practitioner to set the crowns in positions approximating those of a patient.

4. A dental apparatus comprising a plate having a series of holes arranged in an occlusal arch curve therein and also having a series of holes associated with each of the aforesaid holes, a chart, means for holding the chart in position relatively to the plate, a set of artificial crowns each having a pointed dowel extending from its base adapted to be received in any of the holes in the plate to enable the practitioner to set the crowns in positions approximating those of a patient.

5. A dental apparatus comprising a plate having a series of holes arranged in an occlusal arch curve therein and also having a series of holes associated with each of the aforesaid holes, a chart, pegs carried by the plate for securing the chart in position thereon, a set of artificial crowns each having a pointed dowel extending from its base adapted to be received in any of the holes in the plate to enable the practitioner to set the crowns in positions approximating those of a patient.

6. A dental apparatus comprising a plate having a series of holes arranged in an occlusal arch curve therein, and a set of artificial crowns each adapted to be placed in position on the plate by passing a part of the crown through one of the holes in the plate.

7. A dental apparatus comprising a plate having a series of holes arranged in an occlusal arch curve therein and also a plurality of holes associated with each of the aforesaid holes, and a set of artificial crowns each having a dowel pin extending from the base thereof and adapted to be placed in position on the plate by passing the pins into the holes in the plate.

8. A dental apparatus comprising a base, a chart adapted to be placed upon the said base, and a plurality of artificial crowns each adapted to puncture the said chart and to be supported in the said base to enable the practitioner to set the said crowns in positions approximating those of a patient and to make a record thereof on the said chart.

9. A dental apparatus comprising a base, a chart, means for securing the chart in position on the said base, and a plurality of artificial crowns each adapted to puncture the said chart and to be supported in the said base to enable a practitioner to set the said crowns in positions approximating those of a patient and to make a record thereof on the said chart.

10. A dental apparatus comprising a base, a chart means for securing the chart in position on the said base, a plurality of artificial crowns, and a sharpened pin extending from the base of each crown whereby the crowns may be employed to puncture the said chart and to be supported in the said base to enable a practitioner to set the said crowns in positions approximating those of a patient and to make a record thereof on the said chart.

Signed by me this 23rd day of February, 1922.

HARRY H. SHAPIRO.